United States Patent [19]
Bernhardt et al.

[11] Patent Number: 5,710,975
[45] Date of Patent: Jan. 20, 1998

[54] SELECTIVE CALL TRANSCEIVER WITH SYSTEM APPROVED POWER SAVING STATE

[75] Inventors: Richard C. Bernhardt, Wellington; Clinton C. Powell, II, Lake Worth, both of Fla.

[73] Assignee: Motorola, Inc., Schaumburg, Ill.

[21] Appl. No.: 578,755

[22] Filed: Dec. 26, 1995

[51] Int. Cl.⁶ .................................................. H04Q 7/14
[52] U.S. Cl. .................. 455/38.3; 455/574; 455/466; 455/343; 455/227; 340/825.44
[58] Field of Search ........................ 455/38.3, 38.1, 455/38.2, 127, 343, 227, 228, 229, 466, 574; 340/825.44

[56] References Cited

U.S. PATENT DOCUMENTS

| | | | |
|---|---|---|---|
| 5,032,835 | 7/1991 | DeLuca | 455/343 X |
| 5,276,680 | 1/1994 | Messenger | 455/38.3 X |
| 5,301,225 | 4/1994 | Suzuki et al. | 455/343 X |
| 5,392,287 | 2/1995 | Tiedemann, Jr. et al. | 455/343 X |
| 5,459,457 | 10/1995 | Sharpe | 455/38.3 X |
| 5,590,396 | 12/1996 | Henry | 455/38.3 X |

*Primary Examiner*—Reinhard J. Eisenzopf
*Assistant Examiner*—Philip J. Sobutka
*Attorney, Agent, or Firm*—John H. Moore

[57] ABSTRACT

A battery-powered selective call transceiver, operating in two-way communication with an RF communication system, can be put in a power saving state. A user control on the transceiver allows a user to select the duration of a power saving interval. The transceiver sends to the communication system a signal requesting that the transceiver enter a power saving state for the selected interval. Upon receipt of an acknowledgment signal from the system, the transceiver enters the power saving state.

13 Claims, 4 Drawing Sheets

SELECTIVE CALL TRANSCEIVER WITH SYSTEM APPROVED POWER SAVING STATE

FIELD OF THE INVENTION

This invention is generally directed to the field of RF (Radio Frequency) communication, and particularly to two-way messaging applications.

BACKGROUND OF THE INVENTION

Recent improvements in messaging technology have improved the battery life of battery-powered message receivers such as pagers. This is particularly true in subscription communication systems that employ synchronous signaling protocols, because each subscribing message receiver in such a system is assigned a brief time slot in which to look for messages addressed to it. At other times, it goes into a low power mode of operation in order to extend the life of its battery. Nevertheless, more improvement in battery life is desired for all modes of operation.

More recently, the use of CDPD (Cellular Digital Packet Data) and other packet-based data communication systems have been gaining in popularity. These systems use asynchronous symmetrical packet transmission, a form of transmission which can be conveniently used for some forms of message communication. The problem which arises when using battery-powered message receivers in asynchronous systems is that the power drain on the battery is continuous. Because the message receiver is operating in an asynchronous system, its messages may arrive at any time. Consequently, the message receiver must remain "on" continuously, thereby greatly reducing the life of its battery. Much more preferable would be a system that allows message receivers to attain greatly improved battery life, regardless of whether the system operates synchronously or asynchronously.

DESCRIPTION OF THE PREFERRED EMBODIMENT

Figure 1:
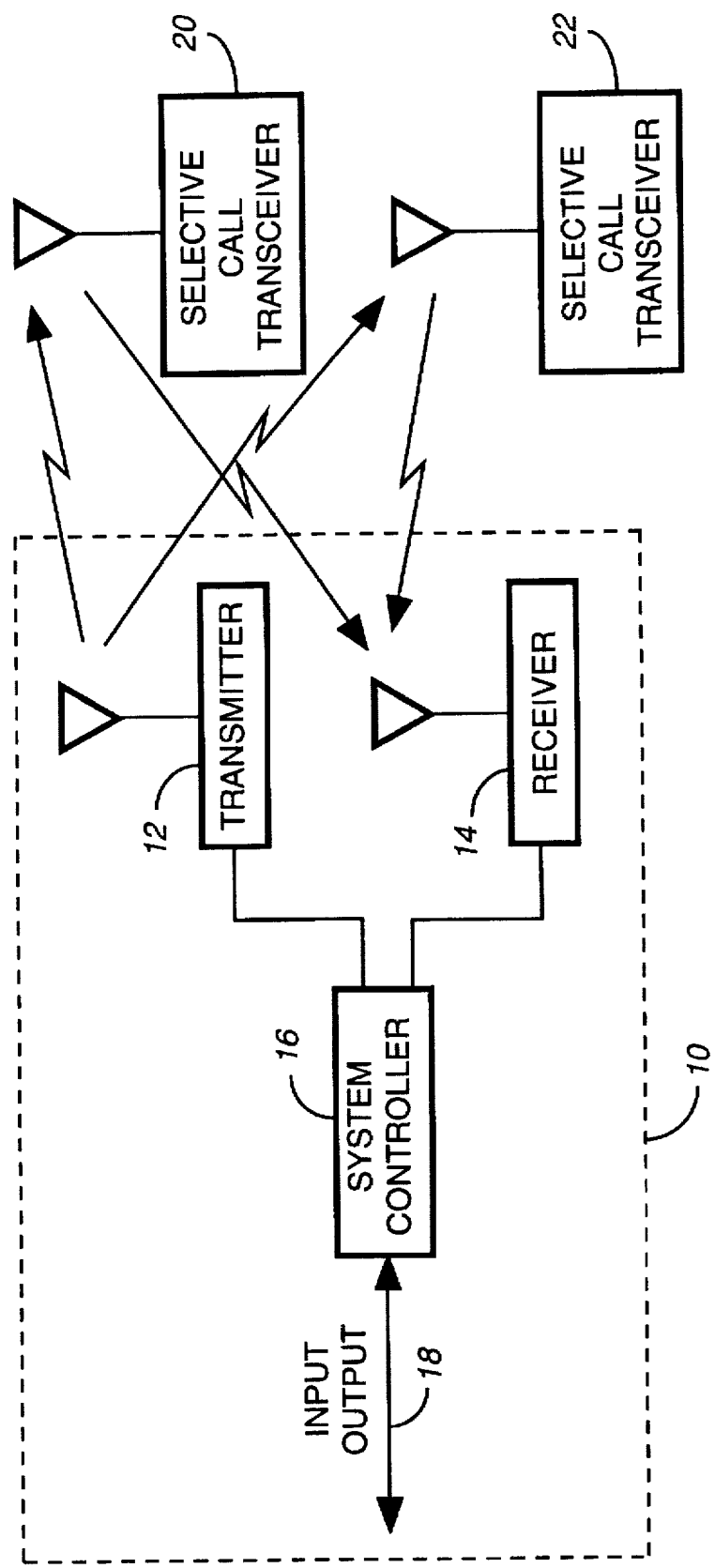
FIG. 1 is a block diagram showing a radio communication system and selective call transceivers therefor that are adapted to operate according to the invention.

A communication system 10 with which the invention is used is shown in FIG. 1. The illustrated system includes an RF transmitter 12, an RF receiver 14 and a system controller 16. Data, messages and the like are received at the system controller's input/output link 18, formatted by the controller 16 according to the signaling protocol and message type used by the system, and forwarded to the transmitter 12. The latter device transmits the data or message to one or more selective call transceivers 20, 22.

A selective call transceiver is a battery-powered RF transmitter/receiver that has a unique address (or is one of a group of transceivers sharing a group address) for receiving messages sent by the transmitter 12.

A selective call transceiver may acknowledge receipt of a message by transmitting an acknowledgment signal back to the system receiver 14. Such acknowledgment may be automatic upon receipt of a message, or initiated by a user of the selective call transceiver. In some applications, a selective call transceiver may initiate a message that is sent to the receiver 14. The system controller causes that message to be properly decoded and forwarded to the indicated addressee via the input/output link 18.

The system 10 may be a so-called CDPD (Cellular Digital Data Packet) system that communicates with the selective call transceivers 20, 22 by means of data packets that are sent and received asynchronously. The specifications for a CDPD system are set forth in Cellular Digital Packet Data Implementor Guidelines published by CDPD Forum, Inc., 1995, the teachings of which are incorporated herein by reference.

The system 10 may also be a so-called paging system that sends and receives messages, either synchronously or asynchronously. Other forms of RF communication systems may also be used. Suffice it to say that the invention may be used with any type of RF communication system that communicates with selective call transceivers that can benefit from being put in a power saving state or mode. In the discussion that follows, the invention is discussed in terms of an exemplary CDPD system and a selective call transceiver that operates with such a system.

The selective call transceivers 20, 22 will normally include a number of functional blocks, such as a CPU (Central Processing Unit), receiving circuitry, decoder, a clock, etc. In order to save power and lengthen the life of the battery in the selective call transceiver, it is desirable to periodically remove (or substantially reduce) the power that is normally supplied to one or more of those blocks. Thus, when the selective call transceiver goes into a power saving state, the current drain on the battery will be reduced by reducing the power consumed by one or more functional blocks. (The time during which the selective call transceiver is in a power saving state is referred to herein as the power saving interval.) For example, some of the receiving circuitry and the decoder may be shut off or powered down, while still supplying sufficient power to the CPU and its clock so that the selective call transceiver will automatically resume its fully active state when the power saving interval has ended.

In order to put a selective call transceiver in a power saving state in accordance with the invention, a communication link is first established between the selective call transceiver and the communication system. For example, the selective call transceiver 20 may establish communication with the system 10 by sending to the system 10 a conventional "registration" signal that identifies the selective call transceiver.

Once the selective call transceiver 20 has "registered" with the system 10, the selective call transceiver 20 can then, either immediately or later, send to the communication system 10 a signal requesting that the selective call transceiver 20 enter a power saving state. The communication system 10 then responds by sending to the selective call transceiver 20 an acknowledgment signal, indicating receipt of the request, and approval for the selective call transceiver to enter the power saving state. Upon receipt of the acknowledgment signal, the selective call transceiver enters the power saving state and remains in that state for a selected power saving interval.

While the selective call transceiver is in the power saving state, it is incapable of receiving and decoding incoming messages. Consequently, during the power saving interval the system 10 stores messages intended for the selective call transceiver 20. When the power saving interval ends, the selective call transceiver preferably detects the end of its power saving interval and sends a signal to the communications system 10 indicating that the selective call transceiver's power saving state has ended, and that it is in a fully active state in which it can receive and decode its messages. The system 10 may then start sending any stored messages to the selective call transceiver 20.

Preferably, the duration of the power saving interval can be selected using the selective call transceiver 20. Further, it is also preferable that the duration of the power saving interval be variable so that the user of the selective call transceiver may select either a short power saving interval or a longer power saving interval. It will be understood that selecting a long power saving interval will increase the life of the battery in the selective call transceiver at the expense of latency. Latency is the amount of time that lapses between the receipt of a message by the system 10 and its transmittal to the intended selective call transceiver. Thus, if a long latency period is acceptable to the user, the user can select a longer power saving interval. Conversely, if the user requires a short latency, he will necessarily select a short power saving interval. In some circumstances, the user may elect not to put his selective call transceiver in a power saving state so that his selective call transceiver can immediately receive any urgent message.

It will be appreciated that placing selective call transceivers in a power saving state has an effect on the operation of the communication system. If many selective call transceivers are selected to have relatively long power saving intervals, the effect on the system 10 will be that it will be required to store many messages for later transmission. The operator of system 10 may, therefore, elect to set a maximum duration for power saving intervals. This maximum duration is preferably made known to the selective call transceivers by the system 10 sending a message to the selective call transceivers advising them of the maximum duration of the power saving interval that will be permitted.

While a user's selective call transceiver is in a power saving state in which it is incapable of receiving and decoding incoming messages, the user may decide that he or she needs to place the selective call receiver in its active state immediately, rather than waiting for the power saving interval to automatically terminate. In the preferred embodiment, the selective call transceiver may be manually reset from the power saving state to its active state by operation of the user.

Figure 2:
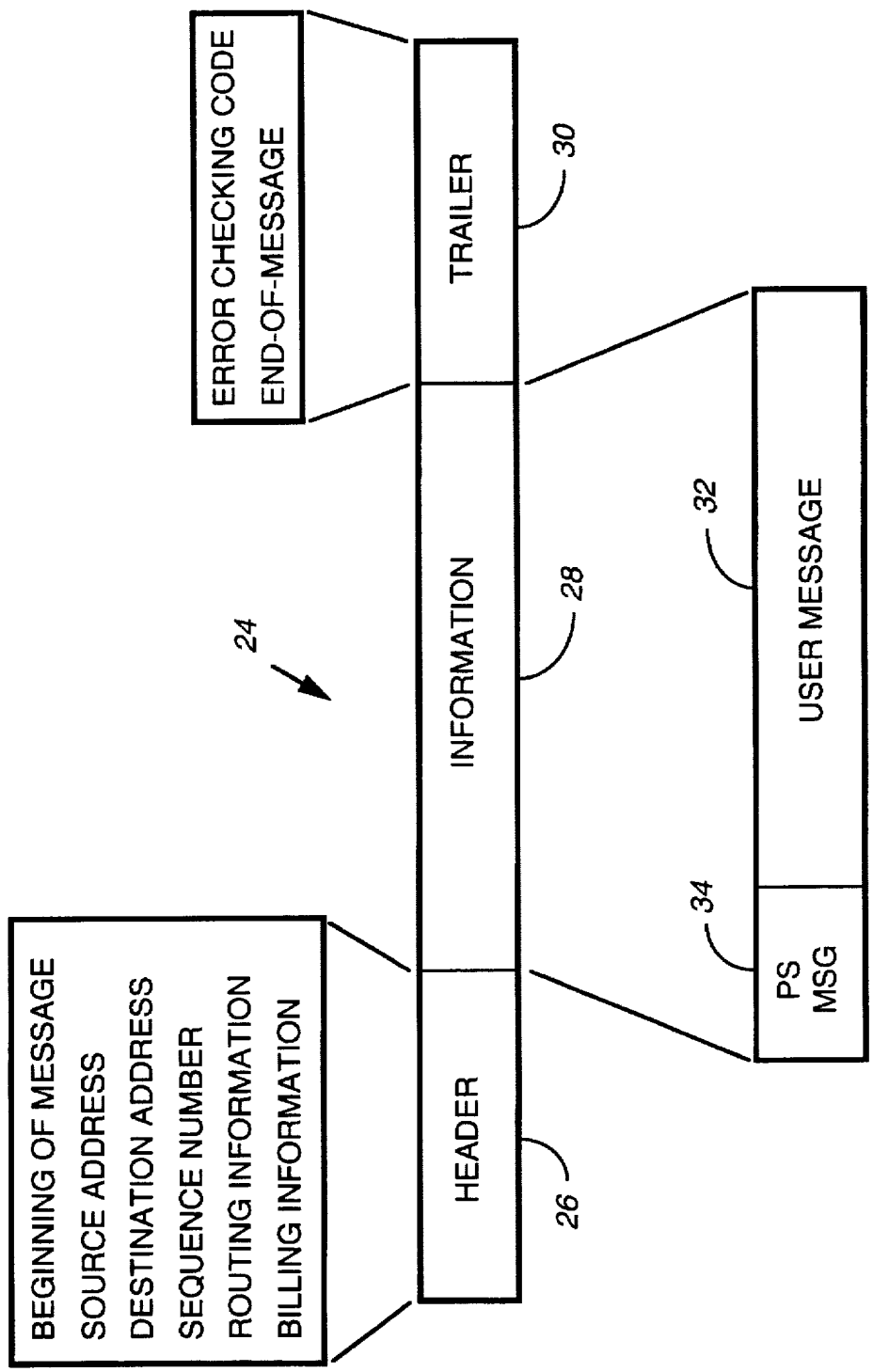
FIG. 2 illustrates the format of a signal which a selective call transceiver sends to the communication system, and vice versa, to implement a power saving state in the transceiver.

Referring now to FIG. 2, there is shown a data packet of the type that may be used in sending information from the system 10 to a selective call transceiver, and from the selective call transceiver back to the system 10. The illustrated data packet 24 includes a header 26, an information portion 28 and a trailer 30. The header 26 includes such information as the beginning of a message, the source address, the destination address, sequence number, routing information and billing information. The information portion 28 includes a user message 32 and a power saving message 34. The latter message is used by the system for informing the selective call transceivers of the maximum duration of a power saving interval that they may select. This portion of the data packet may also be used by the selective call transceivers for indicating to the communication system that they desire to enter a power saving state and the duration of that state or interval.

Figure 3:
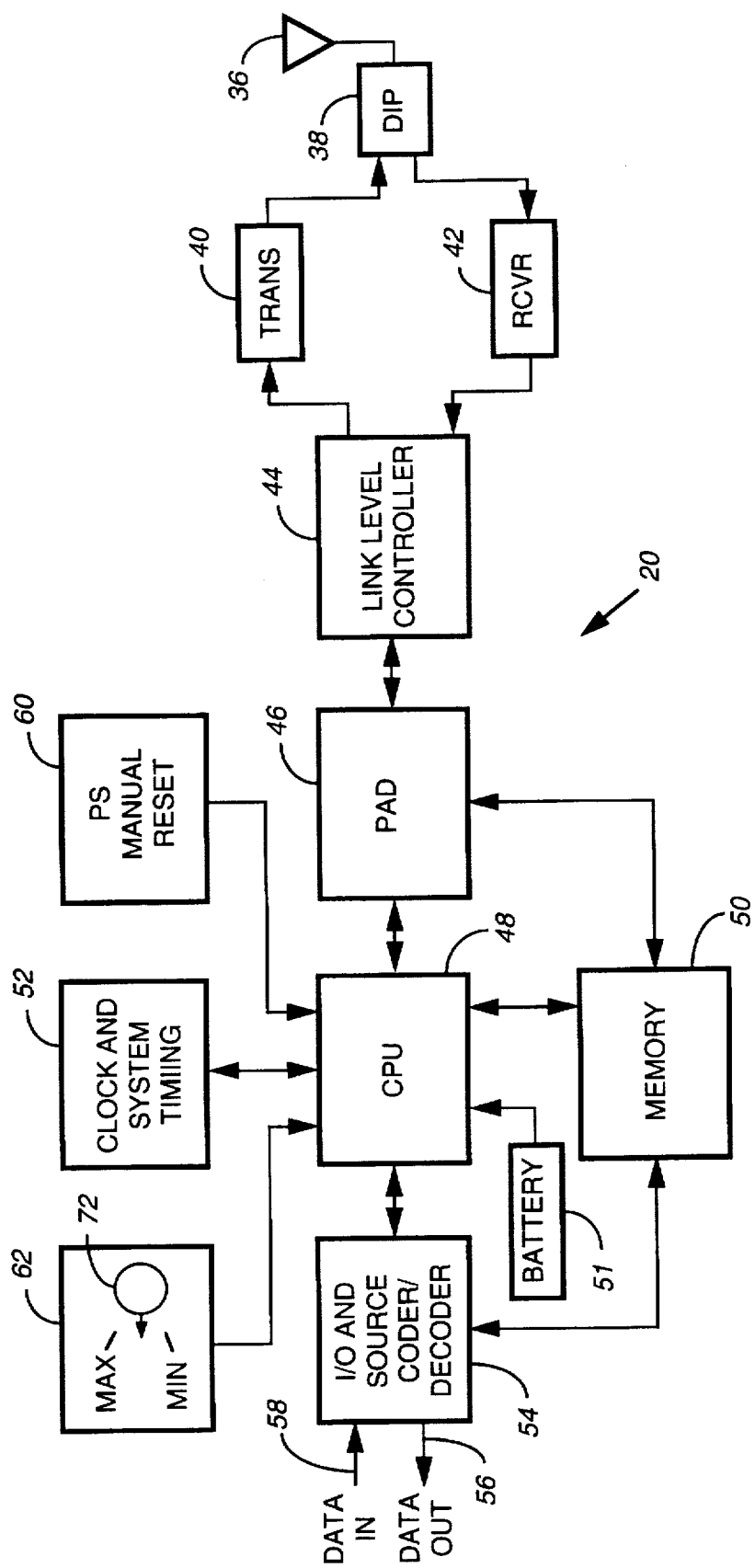
FIG. 3 is a block diagram of a selective call transceiver constructed in accordance with various aspects of the invention.

Referring now to FIG. 3, there is shown an electrical block diagram of the selective call transceiver 20. All the blocks shown in FIG. 3 are conventional except for those which specifically deal with setting and resetting the power saving state, as will be described.

An antenna 36 is coupled to a diplexer (DIP) 38 in order to connect the antenna either to a transmitter 40 or to a receiver 42 in a conventional manner. The input of the transmitter 40 and the output of the receiver 42 are coupled to a link level controller 44. When the transceiver is in the transmit mode, the link level controller 44 puts data packets in a frame format for transmission by the transmitter 40. When the transceiver 20 is in the receive mode, the opposite operation takes place, i.e., the frame format is removed from the incoming data packets.

The controller 44 is coupled to a packet assembler/disassembler (PAD) 46 whose function, in the transmit mode, is to attach the header and trailer to the information packets and, in the receive mode, to disassemble the headers and trailers from the information packets. A processor or CPU 48 and a memory 50 are both connected to the PAD 46. The memory 50, operating under control of the CPU 48, receives and stores data packets that have been disassembled by the PAD 46. Acting under the control of the CPU 48, the memory 50 also stores the data packets in reassembled form to form a message. Operating instructions for the CPU are also stored in the memory 50 or in a memory which is integral to the CPU 48.

Also coupled to the CPU 48 is a battery 51, a clock and system timing block 52 and an I/O and source code/decoder 54. The battery 51 supplies power to CPU and to all the functional blocks in the transceiver, even though it is shown as being directly coupled only to the CPU 48.

The block 52 includes a clock which conventionally provides timing information for operation of the CPU 48. When the transceiver 20 is in the receive mode, the block 54 decodes messages that are stored in the memory 50 and couples those messages to a display, enunciator (not shown) or any other type of output device via a data out port 56. When the transceiver 20 is in the transmit mode, information received via data input port 58 is buffered by the block 54 and properly coded or assembled, under control of the CPU 48, for storing in the memory 50 and subsequent assembly and formatting into data packets which are transmitted by the transmitter 40. The data in port 58 may receive data from a keyboard, a computer, buttons located on the transceiver 20, or from any other suitable input device.

Figure 4:
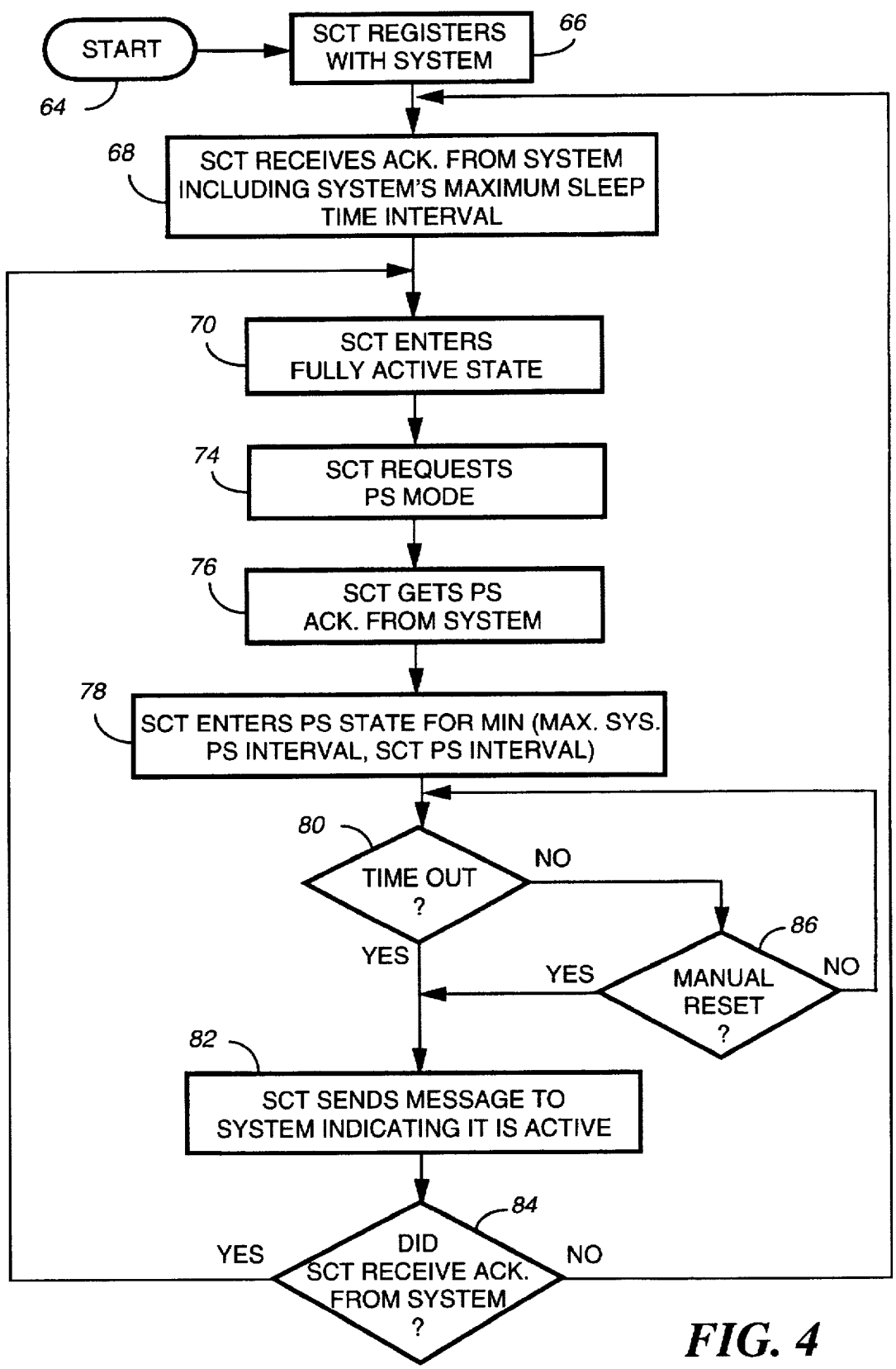
FIG. 4 is a flow chart indicating how the communication system and a selective call transceiver are preferably programmed to operate in accordance with the invention.

The two blocks in FIG. 3 which are not conventional are block 60 (Power Saving manual reset) and block 62 which is a user control for selecting the duration of a power saving interval for the transceiver 20. Both these blocks will be explained in connection with the flow chart which is shown in FIG. 4. This flow chart represents instructions that are stored in the memory 50 for implementing the power saving aspects of the transceiver's operation, and additionally reflect programming stored in the system controller 16 (FIG. 1) for controlling the operation of the communication system 10 in connection with the power saving operation of the selective call transceivers.

Referring now to FIG. 4, the implementation of the power saving process begins with a start instruction 64 followed by step 66 in which the selective call transceiver (SCT) 20 registers with the communication system 10. At this point, all the blocks shown in FIG. 3 are fully powered so that the selective call transceiver 20 is in its fully active state, i.e., capable of sending and/or receiving messages. This registration may take place by the selective call transceiver 20 transmitting a conventional CDPD registration signal to the communication system 10.

In the next step 68, the selective call transceiver (SCT) 20 receives from the system 10 an acknowledgment of the registration signal sent in step 66, and an indication of the maximum sleep time interval (power saving interval) permitted by the system. This signal, received from the communication system 10, may have the format shown in FIG. 2 in which the maximum power saving or sleep time interval that the system will permit is included in the power saving message 34.

The next step 70 causes the selective call transceiver to enter a fully active state in which it is ready for full communication with the system 10. All functional blocks shown in FIG. 3 are powered on. Of course, if the transceiver reached step 70 via steps 66 and 68 (as it will on the first pass through this program)., it will already have been in an active state. Step 70 puts in an active state a transceiver which reaches step 70 by a different route (from step 84).

At this point, it will be assumed that the user of the selective call transceiver 20 wishes to place his transceiver in the power saving state. Referring back to FIG. 3, this is accomplished by the block 62 in which a user control, shown in the form of a continuously or discretely rotatable knob 72, is used to select a variable power saving interval: a minimum power saving interval (which may be zero), a maximum power saving interval, or any interval in between. The duration of the interval thus selected is conventionally coded and coupled to the CPU 48 which stores it in the memory 50.

As discussed earlier, if the user selects the maximum duration for the power saving interval, his transceiver 20 will have a maximum battery life but will also have maximum latency. Conversely, selection of the minimum power saving interval will extend battery life for a shorter period, but it will also provide for shorter latency.

In response to the user selection of a power saving interval, the CPU 48 now executes step 74 (FIG. 4). This causes the transceiver 20 to transmit to the communication system 10 a signal indicating that this particular selective call transceiver 20 intends to enter a power saving state, including the interval for which the transceiver 20 intends to remain in that state. When the communication system 10 receives this signal, it stores in its memory (in the system controller 16) an indication of the identity of the requesting transceiver and the requested duration of its power saving state. Then, according to the next step 76, the selective call transceiver receives a power saving acknowledgment signal from the system 10.

According to the next step 78, the selective call transceiver enters the power saving state for a time interval which is the minimum of either the maximum power saving interval (sleep time) allowed by the system per step 68, or the power saving interval selected by the user and transmitted to the system in step 74. At this point, the transceiver's CPU 48 causes all functional blocks of the transceiver 20 to be turned off except for the CPU 48, the memory 50 and the clock and system timing block 52. The system 10 will now send no messages to this particular selective call receiver until its power saving interval has ended.

In the next step 80, the CPU 48 determines whether a power saving timer has timed out, i.e., whether the power saving interval has ended. If the answer to that inquiry is "yes", the process proceeds to step 82 wherein the transceiver 20 sends a message to the system 10 indicating that the transceiver is once again active and able to communicate with the system. The CPU 48 now causes power to be applied to all of the blocks shown in FIG. 3. If the system 10 receives the message sent per step 82, it will send an acknowledgment system back to the transceiver 20. In step 84, the transceiver asks whether it received that acknowledgment from the system. If the answer is "yes", the process returns back to step 70, and the transceiver 20 enters a fully active state, ready to communicate fully with the system 10 and receive any messages that may have been stored during its power saving interval. If the execution of step 84 resulted in a "no", then the process returns back to step 66 to register again with the system and follow through the rest of the illustrated steps. Referring back to step 80, if the power saving interval had not elapsed, then the process would proceed to step 86 to determine whether a manual reset had been activated. In other words, has the user elected to manually reset the transceiver 20 from its power saving state to its fully active state. Referring briefly to FIG. 3, the block 60 is a user control (such as a push button) that the user may actuate in order to terminate the transceiver's power saving state at will. If the user has not elected to use the manual reset, the process loops through steps 80 and 86 until the power saving interval expires. On the other hand, if the user elects to operate the manual reset, the process proceeds from step 86 directly to step 82 in order for the transceiver 20 to send to the system a message indicating that it is active.

From the foregoing description, it will be appreciated that the invention provides for longer battery life for selective call receivers and, significantly, allows the user to choose the power saving that it right for him by trading latency for battery life. These advantages are attained while yet allowing the system operator to set the maximum duration for a power saving interval so as not to unduly burden the communication system.

Although the invention has been described in terms of a preferred embodiment, it will be obvious to those skilled in the art that many alterations and modifications may be made without departing from the invention. Accordingly, it is intended that all such modifications and alterations be considered as within the spirit and scope of the invention as defined by the appended claims.

We claim:

1. For use with an asynchronous communication system that exchanges information with a selective call transceiver by transmissions that occur at random intervals, a method of establishing a power saving state within the selective call transceiver without losing information comprising:

a) establishing a communication link between the selective call transceiver and the communication system;

b) sending from the selective call transceiver to the communication system a signal requesting that the selective call transceiver, be permitted to enter a power saving state for a predetermined, uninterrupted power saving interval;

c) if the communication system approves the request, sending an acknowledgment signal from the communication system to the selective call transceiver;

d) if the acknowledgement signal indicating request aaproval is received by the selective call receiver, causing the selective call transceiver to enter the power saving state; and e) during the power saving interval, storing messages intended for the selective call transceiver.

2. A method as set forth in claim 1 wherein the power saving state lasts for an interval whose maximum duration is controlled by the communication system.

3. A method as set forth in claim 1 including selecting a duration for the power saving interval at the selective call transceiver.

4. A method as set forth in claim 3, further including transmitting from the communication system to the selective call transceiver a signal indicating a maximum duration for the power saving interval.

5. In a selective call transceiver that is capable of two-way RF communication with an asynchronous communication system by transmissions that occur at random intervals, a method of establishing a power saving state in the selective call transceiver, comprising:
   a) sending to the communication system a signal requesting that the selective call transceiver be permitted to enter a power saving state for a predetermined, uniterrupted power saving interval;
   b) receiving an acknowledgement signal from the communication system approving the request to enter a power saving state; and
   c) entering the power saving state if the acknowledgement signal is received.

6. A method as set forth in claim 5 wherein the power saving interval is variable.

7. A method as set forth in claim 6, including using the selective call transceiver to select a duration for the power saving interval.

8. A method as set forth in claim 5 further including detecting the end of the power saving interval and sending a signal to the communication system indicating that the selective call transceiver's power saving state has ended.

9. A method as set forth in claim 8 including manually re-setting the selective call transceiver from the power saving state to an active state.

10. In a selective call transceiver that is capable of two-way RF communication with an asynchronous communication system by transmissions that occur at random intervals, a method of establishing a power saving state in the selective call transceiver, comprising:
   a) sending to the communication system a signal requesting that the selective call transceiver be permitted to enter a power saving state for a user-selected, uninterrupted power saving interval;
   b) receiving an acknowledgment signal from the communication system approving the request to enter a power saving state;
   c) entering the power saving state if the acknowledgement signal is received;
   d) detecting the end of the power saving interval; and
   e) sending a signal to the communication system indicating that the selective call transceiver's power saving state has ended.

11. A method as set forth in claim 10 including manually re-setting the selective call transceiver from the power saving state to an active state.

12. A battery-powered selective call transceiver capable of two-way RF communication with an asynchronous communication system by transmissions that occur at random intervals, comprising:
   a receiver for receiving incoming signals;
   a transmitter for sending outgoing signals at random intervals;
   a memory for storing an indication of a duration for a power saving state; and
   a processor coupled to the memory and programmed to cause the transmitter to send to the communication system a signal indicating that the selective call transceiver be permitted to enter the power saving state for a predetermined, uninterrupted power saving interval, and to cause the selective call reveiver to enter the power saving state in response to the selective call receiver receiving a signal from the communication system indicating request approval.

13. A battery-powered selective call transceiver as set forth in claim 12 further including a user control for selecting a duration for the power saving interval, the processor being responsive to the user control for causing an indication of the selected duration to be stored in the memory.

\* \* \* \* \*